(12) United States Patent
Matta et al.

(10) Patent No.: US 7,522,154 B2
(45) Date of Patent: Apr. 21, 2009

(54) SLIDE PAD NOTEBOOK POINTING DEVICE WITH HIDDEN SPRING SYSTEM

(75) Inventors: Farid Matta, Los Altos, CA (US); Jonah Harley, Mountain View, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 650 days.

(21) Appl. No.: 10/902,909

(22) Filed: Jul. 29, 2004

(65) Prior Publication Data

US 2006/0022937 A1    Feb. 2, 2006

(51) Int. Cl.
*G09G 5/00* (2006.01)
*G09G 5/08* (2006.01)

(52) U.S. Cl. ............................... 345/157; 345/156

(58) Field of Classification Search ........ 345/156, 345/184, 157; 341/5, 31
See application file for complete search history.

(56) References Cited

U.S. PATENT DOCUMENTS

| 4,670,743 | A | * | 6/1987 | Zemke ........................ 345/157 |
| 4,692,756 | A | * | 9/1987 | Clark ........................... 345/156 |
| 5,086,296 | A | * | 2/1992 | Clark ........................... 345/157 |
| 5,956,016 | A | * | 9/1999 | Kuenzner et al. ............. 345/156 |
| 6,326,948 | B1 | * | 12/2001 | Kobachi et al. ............. 345/157 |
| 6,642,919 | B1 | * | 11/2003 | Jaeger et al. ................. 345/161 |
| 6,839,050 | B2 | * | 1/2005 | Sakamaki et al. ........... 345/156 |
| 2004/0169634 | A1 | | 9/2004 | Stromberg |
| 2005/0068292 | A1 | | 3/2005 | Duarte et al. |
| 2005/0225529 | A1 | | 10/2005 | Shinokura et al. |
| 2005/0243074 | A1 | | 11/2005 | Osborn |

OTHER PUBLICATIONS

International Search Report dated May 3, 2006.

* cited by examiner

*Primary Examiner*—Kevin M Nguyen

(57) ABSTRACT

A pointing device having a moveable puck and a first belt having a slot therein in which said puck moves in a first direction is disclosed. The first belt is wrapped around the first and second belt guides such that the first belt moves back and forth in a second direction different from the first direction. A spring system returns the puck to an equilibrium position when the puck is released from a position that is displaced from the equilibrium position. A sensor measures the position of the puck. In one embodiment, the spring system includes first and second springs that are attached to a surface that is fixed with respect to the first belt. The first spring provides a restoring force in one direction when the second spring provides a restoring force in the opposite direction and vice versa.

5 Claims, 7 Drawing Sheets

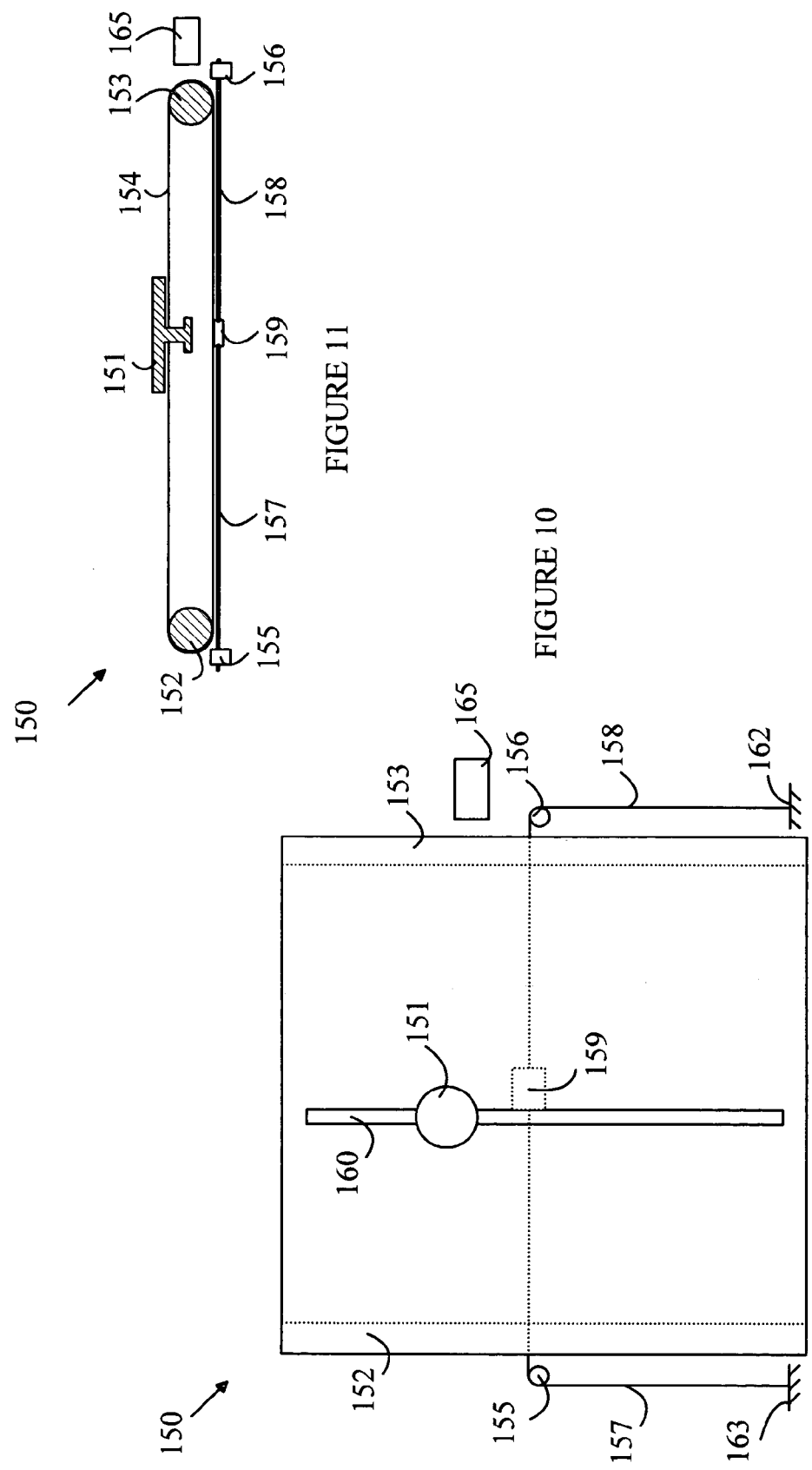

SLIDE PAD NOTEBOOK POINTING DEVICE WITH HIDDEN SPRING SYSTEM

BACKGROUND OF THE INVENTION

To simplify the following discussion, the present invention will be explained in terms of a pointing device for use on a computer; however, the present invention may be utilized with a wide range of data processing systems including hand held computers, cell phones, video games, and the like. Modem computer operating systems and graphics programs require a pointing device for controlling the position of a cursor on the computer display. For desktop PCs, the most successful pointing device is the "mouse". A mouse is a hand held object that is moved over a flat surface near the keyboard to control the motion of a cursor on the computer display. The direction and distance over which the mouse is moved determines the direction and distance the cursor moves on the display. A conventional mouse provides a rigid object that a user can move with great precision. For a desktop computer, the mouse provides a satisfactory solution to the pointing problem. On the occasion when the workspace is not large enough to provide a path over which the mouse can move and accommodate the desired cursor movement on the display, the user simply picks up the mouse and recenters the mouse in the workspace. Hence, the mouse can provide an almost limitless range of motion.

While the mouse has provided a satisfactory solution to the pointing device problem in the desktop PC market, a similarly successful device is not available for portable and hand-held computers. These computers are often used in environments that lack a sufficiently large flat surface near the keyboard over which a mouse can be moved. Hence, some other form of pointing device is needed when these computers are used in such environments.

A pointing device for use in these environments must solve the problem of moving a cursor quickly and accurately. In addition, the device must operate in an intuitive fashion that a novice user can comprehend without extensive instruction. Further, the pointing device must operate in a limited workspace and fit within the form factor of the computer or hand held device. Finally, the usual constraints of low cost, low power consumption and high reliability must also be met.

In previously filed U.S. patent application Ser. No. 10/723,957, which is hereby incorporated by reference, a pointing device that meets these requirements is described. The pointing device utilizes a puck that moves in a defined field of motion when a user applies pressure to the puck via the user's finger. When the user releases the puck, a set of springs returns the puck to its centered position within the field of motion. The position of the puck is determined by electrodes in the device and is used to position a cursor on the display screen. Software on the attached device translates the motion of the puck during the time the user's finger is pressing on the puck into the appropriate cursor motion on the device's display. For applications where the puck field of motion can map to the full cursor field of motion, the cursor and puck can be permanently coupled, both returning to the center of their respective fields when the puck is released. When the cursor field of motion exceeds the puck field of motion, as is the case on most laptop computers, or where re-centering of the cursor is otherwise undesirable, some mechanism is necessary to decouple the cursor motion from the puck motion during puck re-centering. In these cases, the presence of the user finger is also sensed, so when the user releases the puck, the coupling between the puck and the cursor position is broken by the software, and hence, the cursor does not move while the puck is being recentered.

While the device taught in the above-described patent application provides significant advantages over the dominant prior art solutions to the pointing device problem in the laptop marketplace, there are a number of areas in which improvements would be useful. In particular, it would also be advantageous to provide embodiments in which the springs are not visible and in which the spring mechanism is covered to prevent debris from collecting on or around the springs.

SUMMARY OF THE INVENTION

The present invention includes a pointing device having a moveable puck and a first belt having a slot therein. The puck is positioned to move back and forth in the slot in a first direction. The first belt is wrapped around the first and second belt guides such that the first belt moves back and forth in a second direction different from the first direction. A spring system returns the puck to an equilibrium position when the puck is released from a position that is displaced from the equilibrium position. A sensor measures the position of the puck. In one embodiment, the spring system includes first and second springs that are attached to a surface that is fixed with respect to the first belt. The first spring provides a restoring force in one direction when the second spring provides a restoring force in the opposite direction and vice versa. The first and second springs can be attached to the first belt or the puck. In one embodiment, the first spring includes an elastic cord. In one embodiment, the first belt guide includes a cylindrical surface that rotates about a fixed axle and the first spring includes a coil having a first end attached to the axle and a second end attached to the cylindrical surface. In one embodiment, the sensor includes electrodes on a surface underlying the puck. In one embodiment, the sensor includes an optical encoder that measures the position of the first belt. In one embodiment, the pointing device also includes a second belt having a slot therein. The puck is positioned to move back and forth in the slot in the second direction. The second belt is wrapped around the third and forth belt guides such that the second belt moves back and forth in a first direction.

BRIEF DESCRIPTION OF THE DRAWINGS

FIG. 10 illustrates a top view of another embodiment of a puck carriage according to the present invention.

FIG. 11 illustrates an end view of the embodiment shown in FIG. 10.

DETAILED DESCRIPTION OF THE PREFERRED EMBODIMENTS OF THE INVENTION

Figure 1:
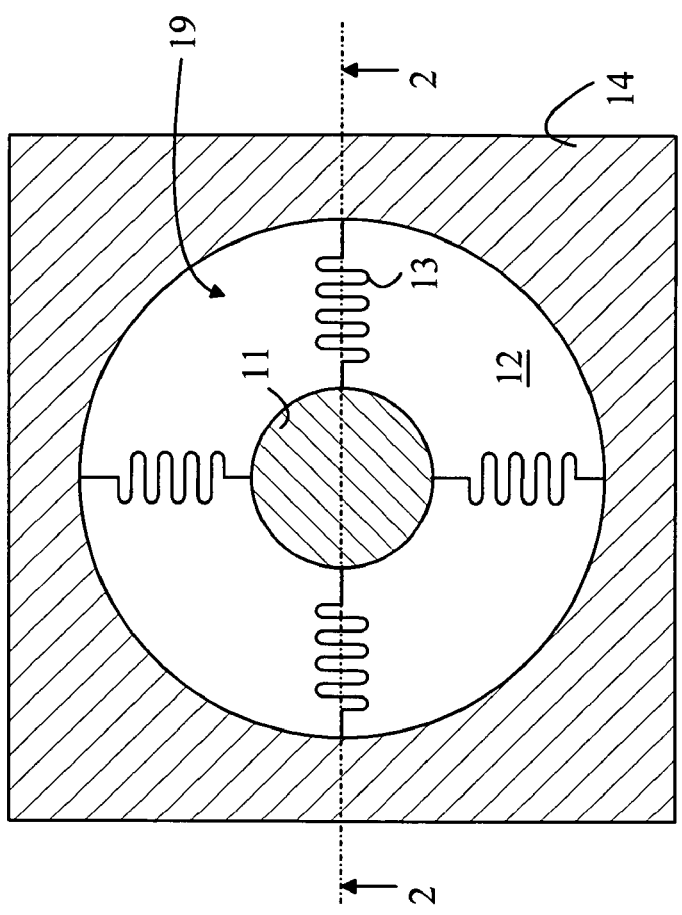
FIG. 1 is a top view of a pointing device of the type described in the above-mentioned patent application.
Figure 2:
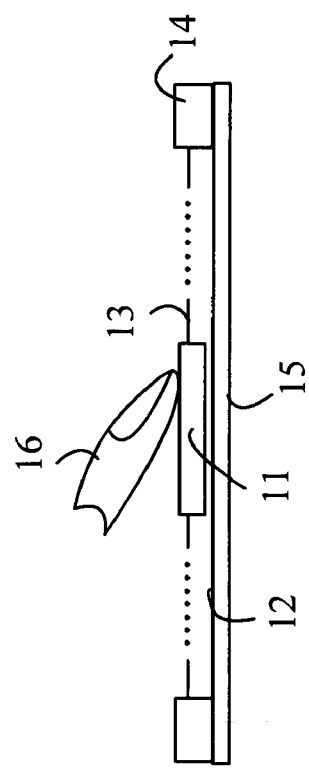
FIG. 2 is a cross-sectional view of the pointing device shown in FIG. 1 through line 2-2 shown in FIG. 1.

The manner in which the present invention provides its advantages can be more easily understood with reference to FIGS. 1 and 2, which illustrate a pointing device 10 according to one embodiment of the invention taught in the above-described patent application. FIG. 1 is a top view of pointing device 10, and FIG. 2 is a cross-sectional view of pointing device 10 through line 2-2 shown in FIG. 1. Pointing device 10 includes a puck 11 that moves over a surface 12 of a substrate 15 within a puck field of motion 19 in response to a lateral force applied to puck 11. The force is typically applied to puck 11 by a user's finger. Puck 11 optionally includes a pressure sensing mechanism that measures the vertical pressure applied to puck 11. In addition, pointing device 10 includes a sensing mechanism for determining the position of puck 11 on surface 12.

For certain applications, typically involving large screens, when the user releases puck 11 by removing the user's finger 16, puck 11 is returned to its centered position by the springs shown at 13 that connect the puck to the side 14 of the puck field of motion. Since the user's finger is not applying a vertical force to puck 11 during its return, the change in position associated with that return motion is not reported to the host device. That is, the cursor remains at its previous location. This provides a convenient "re-centering" capability, typically achieved on a mouse by lifting and replacing the mouse at the center of the field of motion. Re-centering is particularly necessary in laptop computers, hand-held devices and other miniature applications in which the puck field of motion is small relative to the cursor field of motion.

Figure 3:
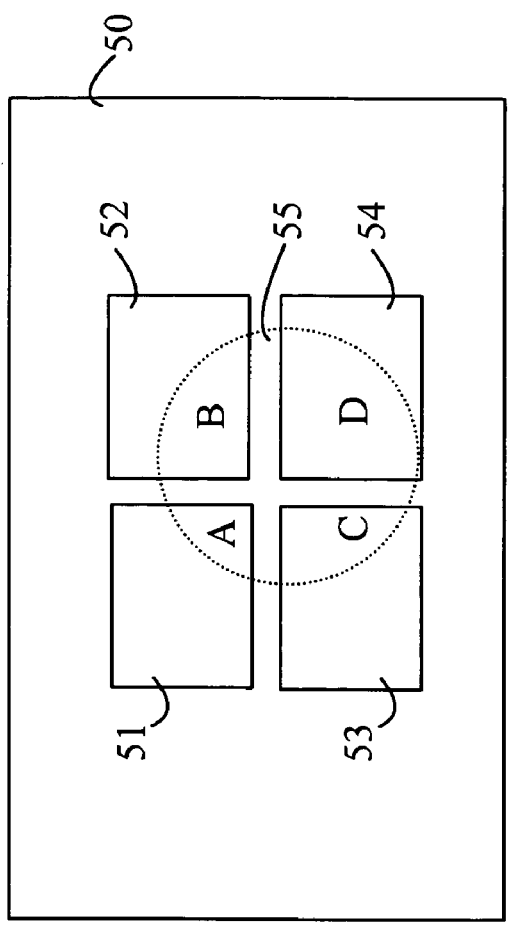
FIG. 3 is a top view of a portion of surface 12 shown in FIG. 1 over which the puck moves.

The manner in which the position of the puck is sensed in one embodiment is described in detail in the above-identified patent application, and hence, will not be discussed in detail here. For the purposes of this discussion, it will be assumed that a capacitive sensing scheme can be utilized to determine the puck's position. Such a scheme is illustrated in FIG. 3, which is a top view of a portion of surface 12 shown in FIG. 1 over which the puck moves in one embodiment of the present invention. Surface 50 includes four electrodes shown at 51-54 having terminals that are connected to an external circuit. To simplify the drawing, these terminals have been omitted. The puck has a bottom surface that includes an electrode 55 that is shown in phantom in the drawing. Electrodes 51-55 are electrically isolated from one another. For example, electrode 55 can be covered with a layer of dielectric that provides the required insulation while still allowing electrode 55 to slide over the other electrodes. The electrodes can in fact be patterned on the back of the substrate whose surface is shown at 50. This reduces the capacitance between the electrodes and the puck electrode, but can be practical for substrate thicknesses of a few millimeters or less. The overlap between electrode 55 and each of electrodes 51-54 depends on the position of the puck relative to electrodes 51-54. Denote the overlaps between electrode 55 and electrodes 51-54 by A-D, respectively.

Figure 4:
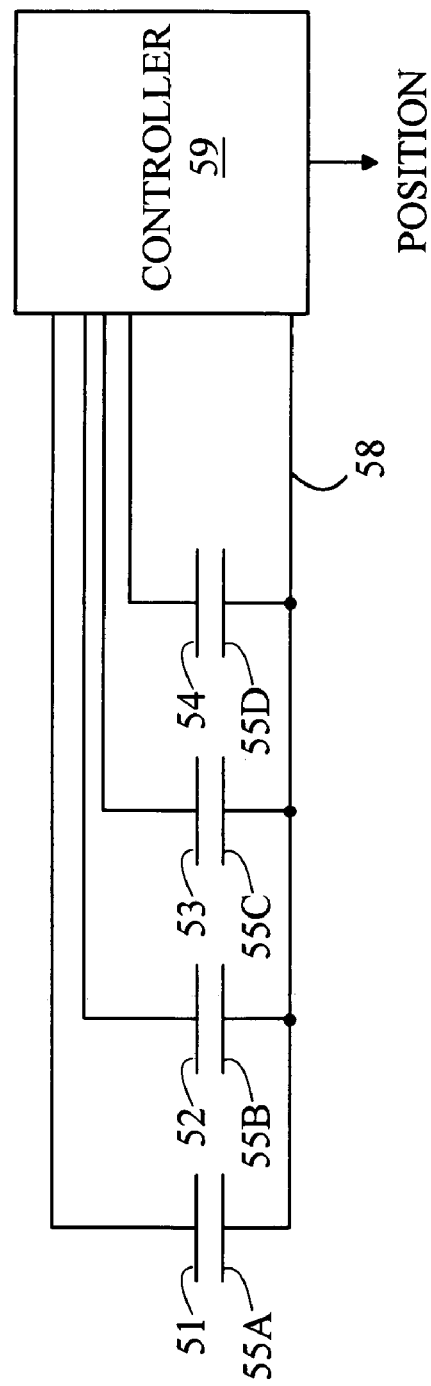
FIG. 4 is a schematic drawing of an equivalent circuit for electrodes shown in FIG. 3.

Refer now to FIG. 4, which is a schematic drawing of an equivalent circuit for electrodes 51-55. The portion of electrode 55 that overlaps electrode 51 forms a parallel plate capacitor having a capacitance that is proportional to overlap A. Similarly, the portion of electrode 55 that overlaps electrode 52 forms a parallel plate capacitor that has a capacitance that is proportional to overlap B, and so on. Since all of the capacitors share portions of electrode 55, the equivalent circuit consists of four capacitors connected to a common electrode shown at 58. This electrode is just electrode 55. Hence, by measuring the capacitance between electrode 55 and each of electrodes 51-54, the position of electrode 55 relative to electrodes 51-54 can be determined. This determination can be made by a controller 59, which may be part of the pointing device or part of the host device of which the pointing device forms a part.

The above-described embodiments use meander springs to reposition the puck when the user releases the puck. Ideally, the springs used to restore the puck position provide a restoring force that recenters the puck without requiring that the user apply a force that would cause the user's hand to become fatigued. In addition, the force should not vary over the puck field of motion, since such variations can interfere with the precision with which the user can position the puck. In addition, embodiments that are designed for use in laptop computers, handheld devices and other miniature applications place a premium on both the lateral size of the pointing device and the thickness of the pointing device. Hence, designs in which the springs increase the thickness or lateral dimensions of the pointing device are not preferred.

The meander springs shown in FIG. 1 prevent the puck from reaching all portions of the field of motion. This is particularly true if the puck motion is toward the attachment point of the spring on the periphery of the puck field of motion. Hence, to provide a device with a specified area in the field of motion, a somewhat larger lateral area is needed to accommodate the unusable space on the surface that is required for the springs in their compressed state. In addition, the force required for moving the puck is different for different areas of the puck field of motion. Accordingly, the meander spring design shown in FIG. 1 is less than ideal.

In addition, the spring mechanism should not be exposed to the environment. From both an aesthetic and practical point of view, the springs should be hidden. In addition, the springs should be as inexpensive as possible. The present invention provides a substantial improvement with respect to these criteria.

Figure 5:
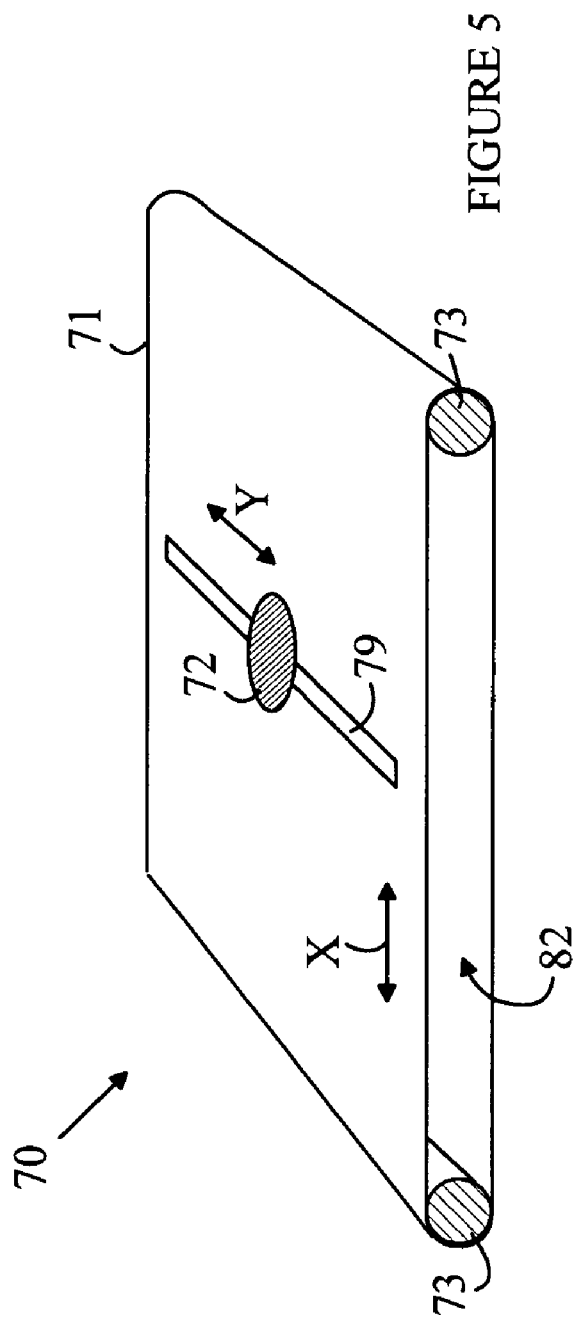
FIG. 5 illustrates a belt having a slot in which the puck travels when moving in the Y-direction.
Figure 6:
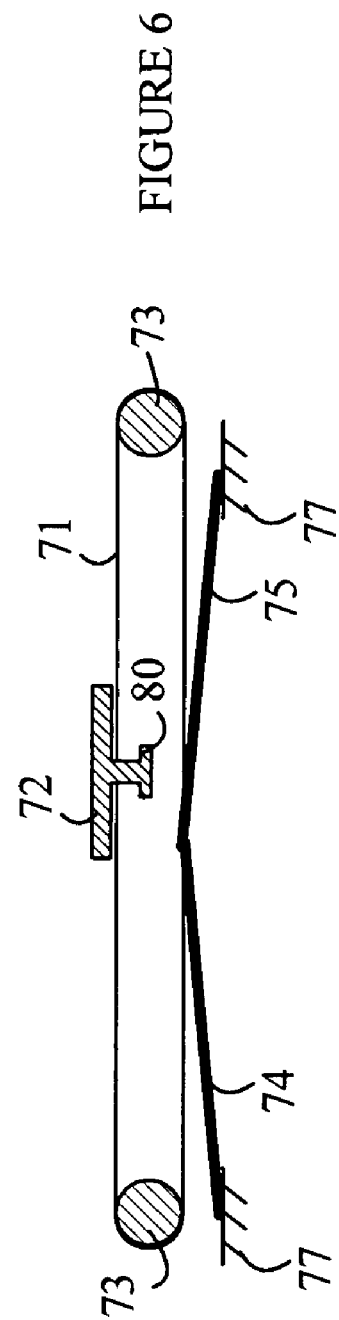
FIG. 6 illustrates the springs that return the puck to its equilibrium position.

The manner in which the present invention provides its advantages can be more easily understood with reference to FIGS. 5 and 6, which illustrate a one-dimensional belt system 70 that provides the restoring force for a puck that is moved in one direction relative to the puck's resting position while hiding the spring mechanism that provides the restoring force. Belt system 70 includes a belt 71 that moves back and forth in one direction on a pair of rollers 73 in the direction shown by the arrows labeled X. The puck 72 moves in a slot 79 in belt 71 in the direction labeled Y. Puck 72 is prevented from leaving slot 79 by flange 80.

A pair of restoring springs returns belt 71 to its resting position in the X direction when the user releases puck 72. The restoring springs are shown at 74 and 75. Each restoring spring is attached between belt 71 and a stationary surface 77. When belt 71 is at its resting point, springs 74 and 75 are equally tensioned. When belt 71 is displaced in the X-direction relative to this equilibrium position, one spring lengthens, and the other spring is shortened. As a result of the pretensioning, both springs are always used in tension, which is appropriate for long thin springs, and elastic bands in particular.

Figure 7:
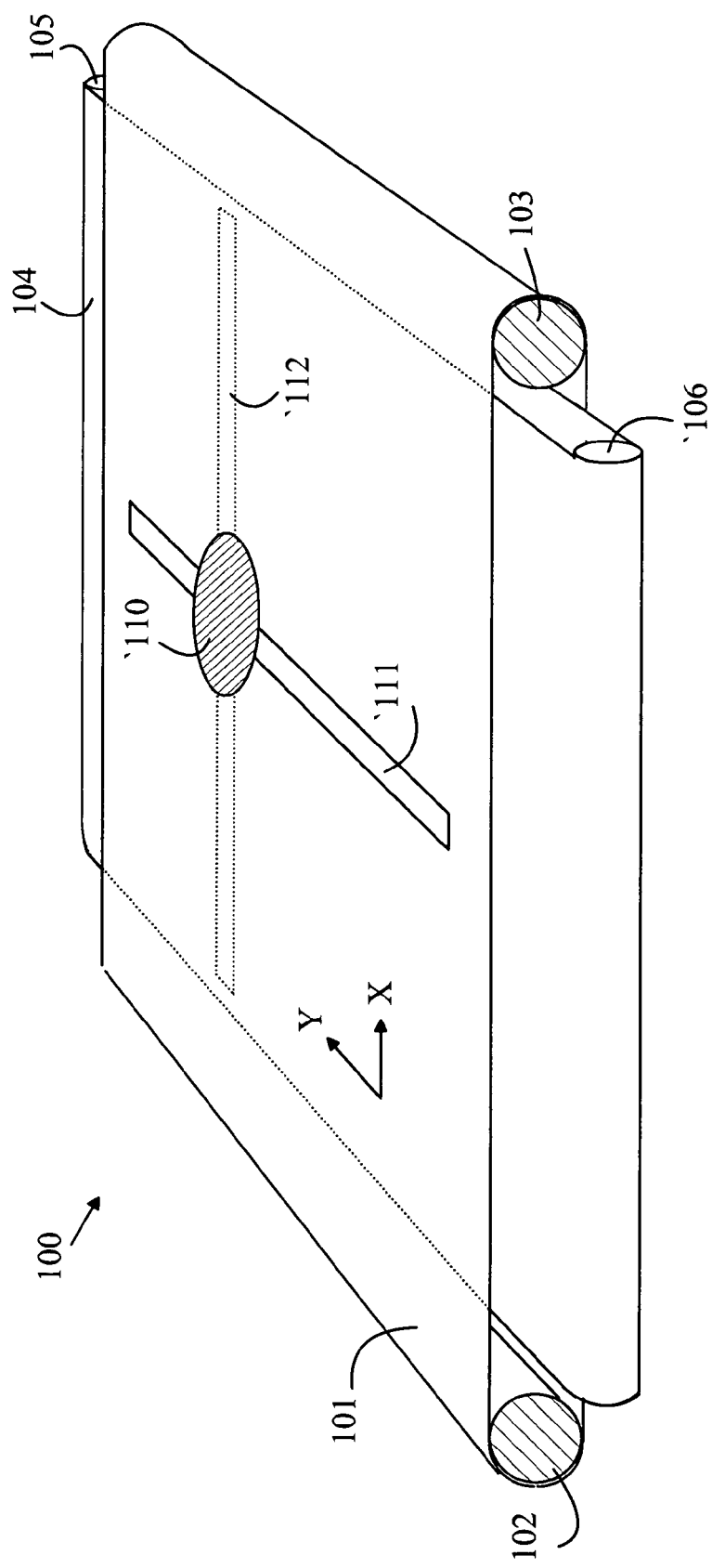
FIG. 7 is a perspective view of a two-dimensional belt carriage system 100 according to one embodiment of the present invention.

The embodiment shown in FIGS. 5 and 6 allows puck 72 to move in both the X and Y directions; however, that embodiment only provides a restoring force in the X direction. To provide the restoring force in the Y direction, a second belt is utilized. The second belt is placed within the cavity 82 formed by the first belt. Refer now to FIG. 7, which is a perspective view of a two-dimensional belt carriage system 100 according to one embodiment of the present invention. Carriage system 100 includes two belts of the type discussed above. Motion in the X-direction is facilitated by belt 101 that moves over rollers 102 and 103. Motion in the Y-direction is facilitated by belt 104 that moves over rollers 105 and 106. The puck 110 is constrained to move within the slots 111 and 112 in these belts.

To simplify the drawings, the return springs for the belts are not shown. However, it is to be understood that belt 101 includes a pair of return springs that are anchored to the bottom surface of belt 101 and to a point that is stationary with respect to belt 101. Belt 104 also includes a pair of return springs that are anchored to the outside bottom surface of belt 104. The springs that return belt 104 to its equilibrium position can be connected to a stationary point that is outside of the belts or to the inside bottom surface of belt 101.

It should be noted that the arrangement shown in FIG. 7 covers both of the sets of springs, and hence, the problems associated with these springs being exposed to the area above the puck are greatly reduced. The springs are shielded from view and protected from debris falling on the top surface of the belts.

The above-described embodiments of the present invention utilize rollers to facilitate the movement of the belts when the puck is moved by the user or returned by the springs. However, embodiments in which the rollers are replaced with smooth curved surfaces can also be constructed if the belts have a surface with a sufficiently low coefficient of friction with respect to the curved surface. Hence, the overall thickness of the pointing device can be maintained at a relatively small value that is consistent with the space available in a laptop computer or handheld device.

Figure 9:
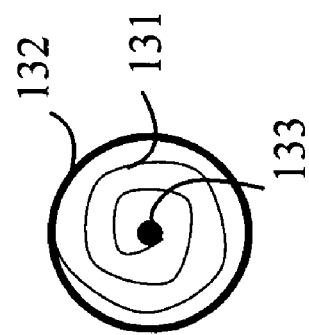
FIG. 9 is an end view of one of the spring-loaded rollers shown in FIG. 8.
Figure 8:
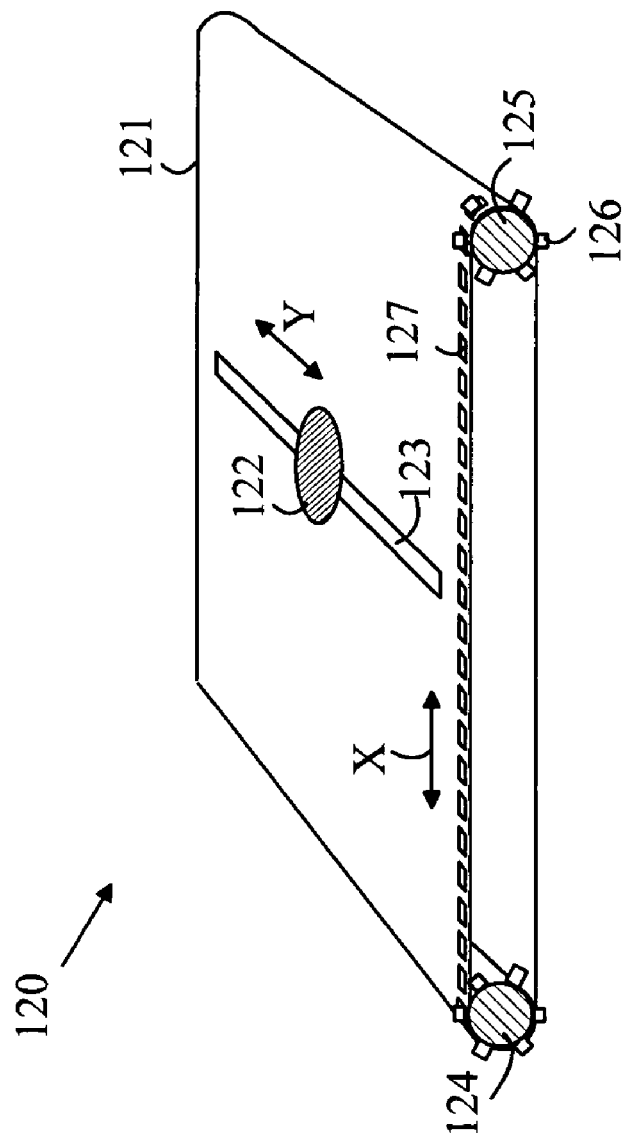
FIG. 8 is a perspective view of a puck carriage that utilizes spring-loaded rollers.

If rollers are utilized, the spring mechanism can also be included in the rollers. Refer now to FIG. 8, which is a perspective view of a puck carriage 120 that utilizes spring loaded rollers. Carriage 120 is similar to carriage 70 shown in FIG. 5 in that it includes a belt 121 having a slot 123 in which puck 122 travels when moving in the Y-direction. When puck 122 is moved in the X-direction, belt 121 moves over the rollers shown at 125 and 124. Referring to FIG. 9, which is an end view of one of the rollers, each roller includes a spiral spring 131 that is fixed between the outer surface 132 of the roller and the shaft 133 about which the outer surface turns. Each spring is wound more tightly when the roller rolls in one direction and loosens when the roller turns in the opposite direction.

To ensure that the puck always return to the center of the field, some mechanism is needed to assure that the belt does not slip relative to the rollers. In the embodiment shown in FIG. 8, belt 121 includes sprocket holes 127 that are engaged by sprockets 126 on the rollers, and hence, assure that belt 121 does not slip relative to rollers 124 and 125.

It should be noted that the belt mechanism shown in FIG. 8 does not require that the springs be anchored to any surface other than the shaft of the rollers and the surface of the rollers at a point within the rollers. In addition, the length of the springs can be made much larger than the maximum distance the puck travels in traversing the field of motion. As will be explained in more detail below, this increases the dimensions of the field of motion without increasing the overall size of the puck assembly.

Consider the field of motion of the puck. To simplify the following discussion, assume that the springs that return the puck to its equilibrium position are the linear springs discussed with reference to FIG. 6. At equilibrium, the springs are tensioned such that the springs are at about half of their maximum extension. When the puck moves to the edge of the field of motion, one spring will be at its maximum extension and the other will be retracted to its minimum, or relaxed length.

Mechanical springs are characterized by a ratio, R, which is the ratio of the maximum length of the spring divided by the original, relaxed length. For commercially available springs, R is typically about 2.5 or less. Hence, the spring must be about 40 percent longer than the distance the puck moves in going from one side of the field of motion to the other side. Accordingly, the ends of springs 74 and 75 shown in FIG. 6 would need to be anchored at a point that is significantly outside the field of motion of the puck if rigid springs are utilized. Such an arrangement increases the overall size of the pointing device.

The spring arrangement shown in FIG. 9 avoids this problem; however, such spring-loaded rollers are relatively expensive to fabricate and difficult to miniaturize. Refer now to FIGS. 10 and 11, which illustrate another embodiment of a puck carriage according to the present invention. To simplify the following discussion Puck carriage 150 shown in these figures is only a one-dimensional carriage. Puck carriage 150 is similar to puck carriage 70 shown in FIGS. 5 and 6 in that the puck 151 moves in a slot in a belt 154 which is wound around two rollers shown at 152 and 153. Puck carriage 150 utilizes elastic cords 157 and 158 for the springs that return the puck to its resting position. The elastic cords are connected to the bottom surface of belt 154 at a point 159 under slot 160. Each elastic cord wraps around a post and is anchored to a point that is stationary with respect to belt 154. The post and anchor point corresponding to elastic cord 158 are shown at 156 and 162. Similarly, the post and anchor point corresponding to elastic cord 157 are shown at 155 and 163.

The redirection of the elastic cords around the posts provides the extra length needed to accommodate the full motion of the puck to be arranged in a manner that does not substantially increase the overall size of the pointing device. It should be noted that although the posts are shown as being outside the area of belt 154, the posts could be located just under the rollers, and hence, no additional space would be needed. Furthermore, the anchor points can be located under the belt as well.

While the above-described embodiment that utilizes elastic cords provides a restoring force in only one dimension, a similar elastic cord arrangement can be utilized in embodiments that provide a restoring force in both dimensions. The embodiment shown in FIGS. 10 and 11 can be applied to the outer belt 101 of the embodiment shown in FIG. 7. A similar pair of elastic cords can be attached to the bottom surface of the inner belt 104 with the elastic cords running between the bottom surface of belt 104 and the bottom surface of belt 101.

The above-described embodiments of the present invention assume that the position of the puck in the field of motion is sensed with a capacitive sensing scheme such as the one described with reference to FIGS. 3 and 4. However, other methods for sensing the position of the puck can be utilized. For example, a sensor that measures the position of the belts can be utilized to provide the position readout. In such an embodiment, an optical sensor such as sensor 165 shown in FIGS. 10 and 11 can be used to detect fiducial marks on the surface of belt 154 as the belt passes over the sensor. The sensor can utilize marks that are printed on the belt, or the sensor can use the surface markings that naturally occur on the belt in a manner similar to that utilized by optical mice to sense movement of a mouse over the surface of a table. Since such position measuring techniques are known to the art, they will not be discussed in detail here.

Figure 12:
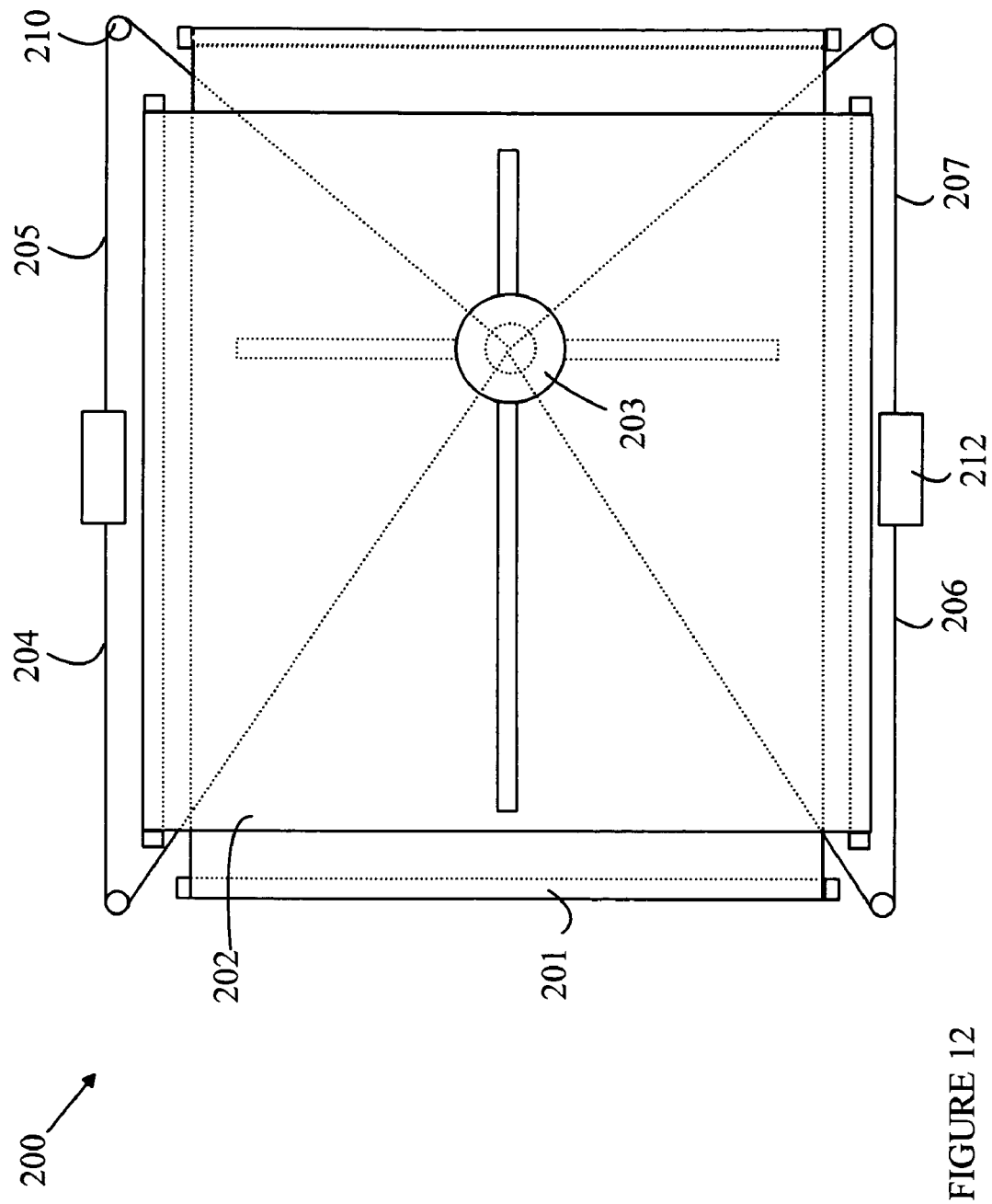
FIG. 12 is a top view of a pointing device according to another embodiment of the present invention.

The embodiments of the present invention discussed above utilize a spring system in which the springs attach to the belts, which, in turn, apply the restoring force to the puck. However, embodiments in which the springs are attached to the puck directly can also be constructed. Refer now to FIG. 12, which is a top view of a pointing device according to another embodiment of the present invention. Pointing device 200 utilizes two belts 201 and 202 arranged in a manner similar to that described above with reference to the embodiments shown in FIG. 7. The puck 203 travels in slots in these belts when a user applies pressure to the puck. When the user releases puck 203, the puck is returned to its equilibrium position by four elastic cords shown at 204-207. One end of each cord is secured to a block that is stationary with respect to the puck motion. The other end of each cord is connected to puck 203. The elastic cords are wrapped around posts 210 in a manner similar to that discussed above. The cords pass between the top and bottom surfaces of the inner belt shown at 201. The edges of the pointing device are covered by an appropriate frame that hides the cords, posts, and ends of the belts. To simplify the drawing, this frame structure has been omitted. Hence, the cords, rollers, and guide posts are not visible from the point of view of the user.

Various modifications to the present invention will become apparent to those skilled in the art from the foregoing description and accompanying drawings. Accordingly, the present invention is to be limited solely by the scope of the following claims.

What is claimed is:

1. A pointing device, comprising:
   first, second, third and fourth belt guides;
   a first belt wrapped around said first and second belt guides and having a slot therein having a first direction;
   a movable puck engaged with said slot;
   a second belt wrapped around said third and fourth belt guides and having a second slot therein having a second direction, said puck additionally engaged with said second slot, said third and fourth belt guides being orthogonal to said first and second belt guides;
   a spring system structured to return said puck to an equilibrium position when said puck is released from a position displaced from said equilibrium position; and
   a sensor that measures the position of said puck,
   wherein said spring system comprises first and second springs attached to an anchor point that is fixed with respect to said first belt, said first and second springs providing respective restoring forces in opposite first directions,
   wherein said spring system comprises third and fourth springs attached to said anchor point that is fixed with respect to said second belt, said third and fourth springs providing respective restoring forces in opposite second directions,
   wherein said first and second springs are also attached to said first belt, and
   wherein said third and fourth springs are also attached to said second belt.

2. The pointing device of claim 1, wherein said first spring comprises an elastic cord.

3. The pointing device of claim 1, wherein said first belt guide comprises a cylindrical surface rotatable about a fixed axle.

4. The pointing device of claim 1, wherein said sensor comprises electrodes on a surface underlying said puck.

5. The pointing device of claim 1, wherein said sensor comprises an optical encoder that measures the position of said first belt.

* * * * *